US008521337B1

(12) United States Patent
Johnson

(10) Patent No.: US 8,521,337 B1
(45) Date of Patent: Aug. 27, 2013

(54) SYSTEMS AND METHODS FOR OPERATING ELECTRICAL SUPPLY

(75) Inventor: John A. Johnson, Belle Harbor, NY (US)

(73) Assignee: Calm Energy Inc., Belle Harbor, NY (US)

( * ) Notice: Subject to any disclaimer, the term of this patent is extended or adjusted under 35 U.S.C. 154(b) by 221 days.

(21) Appl. No.: 13/187,335

(22) Filed: Jul. 20, 2011

Related U.S. Application Data

(60) Provisional application No. 61/365,830, filed on Jul. 20, 2010.

(51) Int. Cl.
*G05D 11/00* (2006.01)

(52) U.S. Cl.
USPC .............................. 700/297; 702/62; 370/252

(58) Field of Classification Search
USPC ............................ 700/297; 702/62; 370/252
See application file for complete search history.

(56) References Cited

U.S. PATENT DOCUMENTS

| | | | | |
|---|---|---|---|---|
| 7,209,838 B1 * | 4/2007 | Wright et al. | .................. | 702/60 |
| 8,301,404 B2 * | 10/2012 | Wright et al. | .................. | 702/60 |
| 8,352,091 B2 * | 1/2013 | Haugh | .......................... | 700/286 |
| 2003/0009401 A1 * | 1/2003 | Ellis | ................................ | 705/35 |
| 2009/0157573 A1 * | 6/2009 | Anderson et al. | ............... | 706/12 |
| 2009/0240449 A1 * | 9/2009 | Gibala et al. | ..................... | 702/62 |
| 2010/0076607 A1 * | 3/2010 | Ahmed et al. | ................ | 700/276 |
| 2010/0179862 A1 * | 7/2010 | Chassin et al. | .................. | 705/10 |
| 2011/0106327 A1 * | 5/2011 | Zhou et al. | .................... | 700/291 |
| 2012/0029716 A1 * | 2/2012 | Sekoguchi et al. | ........... | 700/293 |

* cited by examiner

*Primary Examiner* — Mohammad Ali
*Assistant Examiner* — Anthony Whittington
(74) *Attorney, Agent, or Firm* — Greenberg Traurig, LLP

(57) ABSTRACT

One embodiment of the instant invention is a computer-implemented method that includes steps of: receiving load data for a load, where the load is associated with a smart node that controls a flow of electricity, where the load data includes a service type indication; where the service type indication identifies whether the load receive in a non-firm electricity service, a firm electricity service, or both, where the non-firm electricity service is based on a non-firm service supply arrangement associated with the load and a supplier of electricity, where the non-firm service supply arrangement defines electricity usage based on a reliability level of the electrical supply provided by the supplier of electricity without a guaranteed level of uninterrupted electricity supply, and where the reliability level of the electrical supply is based on an ability to instruct to reduce or shut off the electricity supply.

18 Claims, 9 Drawing Sheets

SYSTEMS AND METHODS FOR OPERATING ELECTRICAL SUPPLY

RELATED APPLICATIONS

This application claims the benefit of U.S. provisional application Ser. No. 61/365,830, entitled "SYSTEMS AND METHODS FOR ELECTRIC GRID OPERATIONS THAT TAKES INTO CONSIDERATION CUSTOMER'S PREFERENCES OF OBTAINING VARYING LEVELS OF ELECTRIC GRID RELIABILITY," was filed Jul. 20, 2010, which is hereby incorporated by reference herein in its entirety for all purposes.

TECHNICAL FIELD

The present invention relates to systems and method for delivering and pricing electrical energy.

BACKGROUND

Typically, for electric service supply providers (e.g., electrical utilities such as Con Edison, PSE&G, etc), financial decisions in the planning and operation of electric grids are usually influenced by costs (e.g. energy losses to provide service, environmental degradation, major project upgrades or reinforcements) while maintaining certain agreed to levels of service reliability and grid efficiencies. Such costs may include real time supply costs from generating electricity, electric losses in the grid to support delivery, environmental costs, and longer term costs to operate the electric grid such as the cost of capital assets like electric cable, substations, generation, and transmission.

SUMMARY OF INVENTION

In some embodiments, the instant invention includes a computer-implemented method that includes at least the following steps of: receiving, by a computer system, first load data for at least one first load, where the at least one first load is associated with at least one first smart node that controls a flow of electricity from an electrical distribution grid to the at least one first load; receiving, by a computer system, second load data for at least one second load where the at least one second load is associated with at least one second smart node that controls the flow of electricity from the electrical distribution grid to the at least one second load; where the first and the second load data that includes a service type indication; where the service type indication identifies whether the at least one first and second load receive in a non-firm electricity service, a firm electricity service, or both, where the non-firm electricity service is based at least in part on a non-firm service supply arrangement associated with each load and at least one supplier of electricity, where the non-firm service supply arrangement defines electricity usage based at least in part on at least one reliability level of the electrical supply provided by the at least one supplier of electricity without at least one guaranteed level of uninterrupted electricity supply, where the at least one reliability level of the electrical supply is based at least in part on an ability to instruct, by the computer system, to reduce or shut off the electricity supply from the electrical distribution grid in accordance with the non-firm service supply arrangement; where the firm electricity service is based at least in part on a firm service supply arrangement associated with each load and the at least one supplier of electricity, and where the firm service supply agreement defines the guaranteed level of uninterrupted electricity supply provided by the at least one supplier of electricity to each associated load; determining, by the computer system, electricity demand over at least one electric grid; optimizing, by the computer system, the electricity demand over at least one electric grid by adjusting the electricity supply to the at least one first load and the at least one second load based at least in part on a plurality of the following: i) the first load data, ii) the second load data; iii) the electricity demand, iv) the service type indication, v) the at least one reliability level of the electrical supply defined by the non-firm service supply arrangement, and vi) the at least one guaranteed level of uninterrupted electricity supply defined by the firm service supply arrangement.

In some embodiments, the at least one first smart node and the at least one second smart mode are electrical switches.

In some embodiments, the non-firm service supply arrangement is a contract. In some embodiments, the firm service supply arrangement is a contract.

In some embodiments, the at least one first load can participate in the non-firm service supply arrangement to receives the non-firm electricity service during at least one first portion of a time period and can participate in the firm service supply arrangement to receives the firm electricity service during at least one second portion of the time period.

In some embodiments, the at least one second load can participate in the non-firm service supply arrangement to receives the non-firm electricity service during the time period.

In some embodiments, the at least one reliability level of the non-firm service supply arrangement is calculated, by the computer system, by deterministic or probability calculations based at least in part on one of the following criteria: i) supplier historical data of the electricity demand of the at least one supplier of electricity; ii) first load historical data for the at least one first load data; and iii) second load historical data for the at least one second load.

In some embodiments, the inventive methods further include at least the following steps of: receiving, by the computer system, supplier data about at least one supplier cost associated with the electricity supply provided by the at least one supplier of electricity; receiving, by the computer system, electricity market data about at least one market cost of electricity; and calculating, by the computer system, at least one price for the at least one reliability level of the non-firm service supply arrangement based at least in part on the at least one supplier cost in the received supplier data and the at least one market cost in the received market data.

In some embodiments, the at least one second load participates in the firm service supply arrangement to receives the firm electricity service during the time period and the at least one first load and the at least one second load participate in an arrangement by which the at least one first load receives the electricity supply intended for the at least one second load during at least one first portion of the time period when the at least one first smart node is instructed to reduce or shut off the electricity supply from the electrical distribution grid of the at least one supplier of electricity to the at least one first load in accordance with the non-firm service supply arrangement.

In some embodiments, the instant invention includes a computer system where the computer system includes at least the following components: a) memory having at least one region for storing computer executable program code; and b) at least one processor for executing the computer executable program code stored in the memory, where the computer executable program code that at least includes the following code: code to receive first load data for at least one first load, where the at least one first load is associated with at least one first smart node that controls a flow of electricity from an electrical distribution grid to the at least one first load; code to receive second load data for at least one second load where the at least one second load is associated with at least one second smart node that controls the flow of electricity from the electrical distribution grid to the at least one second load; where the first and the second load data that includes a service type indication; where the service type indication identifies whether the at least one first and second load receive in a non-firm electricity service, a firm electricity service, or both, where the non-firm electricity service is based at least in part on a non-firm service supply arrangement associated with each load and at least one supplier of electricity, where the non-firm service supply arrangement defines electricity usage based at least in part on at least one reliability level of the electrical supply provided by the at least one supplier of electricity without at least one guaranteed level of uninterrupted electricity supply, where the at least one reliability level of the electrical supply is based at least in part on an ability to instruct, by the computer system, to reduce or shut off the electricity supply from the electrical distribution grid in accordance with the non-firm service supply arrangement; where the firm electricity service is based at least in part on a firm service supply arrangement associated with each load and the at least one supplier of electricity, and where the firm service supply agreement defines the guaranteed level of uninterrupted electricity supply provided by the at least one supplier of electricity to each associated load; code to determine electricity demand over at least one electric grid; code to optimize the electricity demand over at least one electric grid by adjusting the electricity supply to the at least one first load and the at least one second load based at least in part on a plurality of the following: i) the first load data, ii) the second load data; iii) the electricity demand, iv) the service type indication, v) the at least one reliability level of the electrical supply defined by the non-firm service supply arrangement, and vi) the at least one guaranteed level of uninterrupted electricity supply defined by the firm service supply arrangement.

Figure 1:
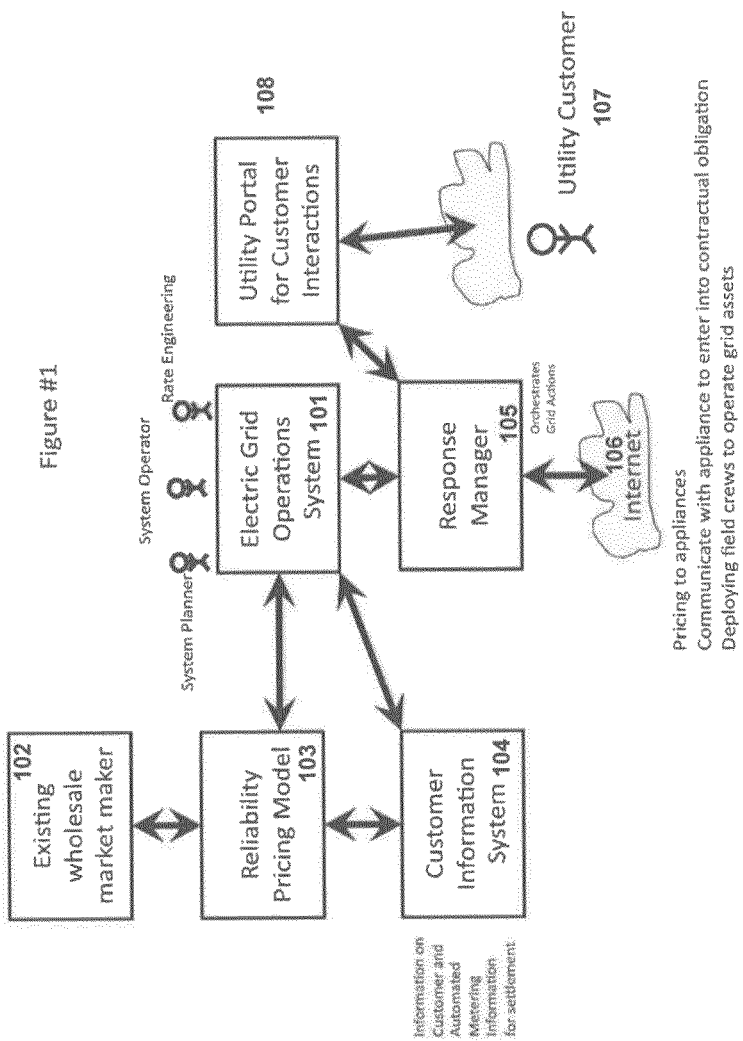
FIG. 1 illustrates one embodiment of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Supplier of electricity (an electricity supplier). A producer of electricity or a manager of an electrical grid.

Advanced Metering Infrastructure (AMI) are systems that measure, collect and analyze energy usage, and communicate with metering devices such as electricity meters, gas meters, heat meters, and water meters, either on request or on a schedule. In some embodiments, such systems include hardware, software, communications, consumer energy displays and controllers, customer associated systems, Meter Data Management (MDM) software, and supplier business systems. In some embodiments, the network between the measurement devices and business systems allows collection and distribution of information to customers, suppliers, utility companies and service providers. In some embodiments, AMI enables these businesses to participate in demand response services. In some embodiments, consumers can use information provided by the system to change their normal consumption patterns to take advantage of lower prices. In some embodiments, pricing can be used to curb growth of peak consumption.

Smart Node. A programmed device that enables two-way communications with an electricity distribution and control system of some embodiments of the instant invention. In some embodiments, the Smart Node can measure load similar to AMI, and switch power supply to and from loads in accordance with the instant invention. In some embodiments, the Smart Node can switch power supply to and from loads in accordance with the instant invention without measuring load. In some embodiments, the Smart Node is associated with a supplier of electricity. In some embodiments, the Smart Node is not associated with a supplier of electricity.

In electricity grids, demand response (DR) mechanisms respond to explicit requests to shut off. In some embodiments, the demand response in accordance with instant invention can involve actually curtailing power used or by starting on site generation which may or may not be connected in parallel with the grid. In some embodiments, the demand response in accordance with instant invention can be a component of smart energy demand, which also includes energy efficiency, home and building energy management, distributed renewable resources, and electric vehicle charging. In some embodiments, the demand response in accordance with instant invention can be employed through the use of dedicated control systems to shed loads in response to a request by a utility or market price conditions. In some embodiments, services (lights, machines, air conditioning) are reduced according to a preplanned load prioritization scheme during the critical time frames. In some embodiments, the demand response in accordance with instant invention can be employed through on-site generation of electricity to supplement the power grid. In some embodiments, the demand response in accordance with instant invention can decrease the peak price and electricity price volatility. In some embodiments, the demand response in accordance with instant invention can increase demand (load) at times of high production and low demand. In some embodiments, the demand response in accordance with instant invention can encourage energy storage to arbitrage between periods of low and high demand (or low and high prices).

The Open Access Same-Time Information System (OASIS), is an Internet-based system for obtaining services related to electric power transmission in North America. It is the primary means by which high-voltage transmission lines are reserved for moving wholesale quantities of electricity. The OASIS concept was originally conceived with the Energy Policy Act of 1992, and formalized in 1996 through Federal Energy Regulatory Commission (FERC) Orders 888 and 889.

Non-Firm electric Service (NFS) is where a load (e.g., customer, dishwasher, microwave, refrigerator, electric plug-in vehicle, etc) is a party to or a beneficiary of an electrical service supply arrangement (a non-firm service supply arrangement) under which the electrical supply is not guaranteed (without a guaranteed level of uninterrupted electricity supply) since the load agrees to only take electric supply from the grid if allowed by an optimization/constraint decision engine implemented in accordance with some embodiments of the instant invention. In some embodiments, the non-firm service supply arrangement specifies that the load agrees that the optimization/constraint decision engine can stop electricity supply entirely when the optimization/constraint decision engine decides to do so. In some embodiments, the non-firm service supply arrangement specifies that the load agrees that the optimization/constraint decision engine can reduce electricity supply by either an agreed load level or a load level unilaterally calculated by a supplier of electricity without shutting the supply off entirely when the optimization/constraint decision engine decides to do so. In some embodiments, the optimization/constraint decision engine is associated with a supplier of electricity. In some embodiments, the optimization/constraint decision engine is associated neither with the supplier of electricity nor a smart node. In some embodiments, the optimization/constraint decision engine is associated neither with the supplier of electricity nor a smart node. In some embodiments, the non-firm service supply arrangement is in a form of a contractual obligation (e.g., contract). In some embodiment, a system of the instant invention can determine, in real time or day ahead or for the future weeks and months, what supply and/or delivery capacity is available in abundance at specific locations to allow the load to take electric supply from the grid. In some embodiments, there are no maximum number of calls to have the contracted electric load demand reduce its usage. In some embodiments, the non-firm electric service can be intelligently communicated to by a system of the instant invention to reduce load based on an agreement of electric service or to respond to supply and delivery price indicators signaling the abundance of these services in real time or day ahead or weeks and months ahead.

Firm electric service is a load (e.g., customer, dishwasher, microwave, refrigerator, plug-in electric or hybrid electric vehicle, etc) that is either (1) not intelligent to respond to price indicators/signals or (2) is a party to or a beneficiary of an electrical service supply arrangement (a firm service supply arrangement) under which the electrical supply is guaranteed (a guaranteed level of uninterrupted electricity supply) since the load has determined that it wants to buy a reliable power for a price, which is higher than in the case of the non-firm service supply arrangement. In one specific example, the firm service supply arrangement can be for an extended period of time to allow electrical infrastructure to be placed in service (e.g., today's high reliability expectation that uses a deterministic evaluation of reliability as a minimum evaluation of available power for the distribution system and service to customer loads). In some embodiments, the firm electric load is purchasing a real option to call on supply and delivery of electricity at any time up to its agreement, which is typically structured in a regulated electric tariff rate (i.e. Demand charges for generation and delivery) and through peak demand measurements determined from utility service revenue metering. In one embodiment, the customer's load as determined by a specific utility revenue meter may decide to sell or barter this reliability contractually to a non-firm load on a short time frame of a day or an hour if its not using the purchased firm capacity at its connection to the grid. In one embodiment, the system can amalgamate AMI metering of firm and non-firm service from more than one customer for optimization of payments for such electric service. In one embodiment, the capability of selling high reliability of service is based on where the firm load is located versus the non-firm load that is buying the reliability.

Some embodiments of the instant invention provides a system that can support the efficient utilitization and investment of electric grid assets while enabling an unprecedented customer choice in the level of reliability of electric service through a combined planning of near term operational decisions and longer term planning decisions. In one embodiment, the instant invention provides for a system that extends off of the existing electric wholesale market in providing price indicators to competitive market place participants. In one specific embodiment, the instant invention provides for a system that requires a minimum calculated level of reliability to be maintained in the distribution system and for every customer or node in the system that may result in scarcity or congestion costs within the distribution system or transmission system as a result of additional load that can not be supported by the distribution system under peak load conditions or when portions of the system are nearing peak operational utilization (e.g., as might happen when distribution equipment fails requiring remaining equipment to carry the load).

In some embodiments, the calculation of predicted congestion costs in the distribution system, based on past historical observations and changes or predicted changes in customer load (e.g. new customers coming on line, customer adds an electric vehicle to charges at home overnight after just purchasing, customer to add photovoltaics) and customer behavior analytics (e.g. propensity for specific characterized customers and customer's appliances and equipment to reduce usage based on pricing, which may be based in part on customer preferences of reliability, supply alternatives (like environmental considerations of green power usage)) can be used to justify planned changes to the electric grid such as new electric distribution infrastructure or calls to third party competitors for more supply capacity in a certain region of the distribution system that has or is predicted to experience overly excessive distribution level congestion costs due to reliability considerations from supply not fully meeting demand at peak load periods.

In one embodiment, these real or anticipated congestion costs, whether impacted by capacity availability or voltage support, can be communicated by a system of the instant invention for relief to the competitive market place through changes in pricing incentives for providers or customers located in this area capable of providing alternative supply of electricity (e.g. energy storage batteries, photovoltaics, electric vehicles, distributed generation) or load modulation (e.g. demand response). In one embodiment, the costs of such pricing incentives can be socialized across the entire service region where all customers can pay for the cost upgrades in new generation supply or new electric cables that could be provided by the electric grid owner, or by third party independent providers of distributed generation or delivery equipment, willing to invest in electric grid infrastructure.

In one embodiment, a guaranteed rate of return on investments can be calculated by a system of the instant invention and/or set by the regulatory bodies for new capital investments.

FIG. 1 illustrates some embodiments of the instant invention that support the metrics and financial decision optimization to plan, maintain and operate on electric grid. In one embodiment, the instant invention provides a system that can act as the market maker 102 and settlement house for bidders wishing to commit funding for investment in electric grid assets. In one embodiment, the instant invention provides a system that can act as the market maker 102 for bilateral transactions for customers 107 to buy or sell levels of reliability (e.g. firm versus non-firm power) and electricity between each other. In one embodiment, the instant invention provides a system that can allow the market maker 102 to interface with the existing wholesale independent system operator OASIS 101 to enable end customers 107 to seamless buy and sell both electricity and the reliability level of electricity at the distribution level. In one embodiment, the instant invention provides a system that allows the distribution operator to be different then the owner of the assets and can obtain a management fee for operating this shared infrastructure (e.g. LIPA owning assets, National Grid operates and obtains a management fee) with settlement of incentives based on a scorecard of performance metrics.

In another embodiment, the instant invention provides a system that can support a Provider of Last Resort (POLR) obligations settlement that could be provided by a State Agency or a Federal Agency or auctioned to third parties whose purpose can include providing the assurance of POLR to all customers if not resolved by the competitive market place (e.g. a government agency similar to an FDIC in insuring that customers will have government support to protect their primary needs of electricity). In one embodiment, the instant invention provides a system that can manage a pool of financial resources (money for rainy day) obtained from utility rates or customers 107 or government to support the insuring of POLR services to customers 107. In another embodiment, the instant invention provides a system that can use a set of rules to determine if such avoided cost is potentially solvable by non traditional electric delivery means such as renewable generation, electric vehicle placement, and load curtailment.

Figure 2:
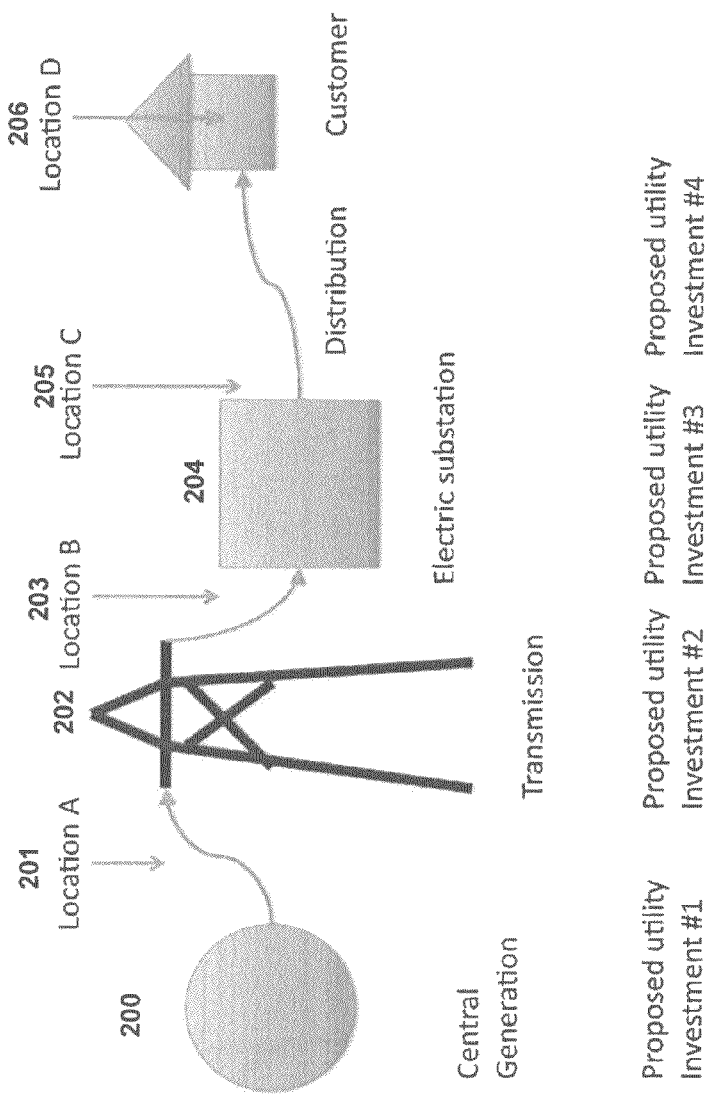
FIG. 2 illustrates another embodiment of the present invention.

FIG. 2 illustrates some embodiments operated in accordance with the instant invention. As shown in FIG. 2, if there is say an electric substation supply constraint, then a location A (201) or a location B (203) solution of say generation supply could not count as taking advantage of avoided costs in the financial calculation, as the substation (204) can not be relieved of its constraint, assuming the direction of flow and associated constraint is for feeding power towards the customer at location D (206).

In one embodiment, for all locations on the electric system, avoided or deferred costs in terms of avoiding additions to capacity ($/KW), whether associated with electric delivery equipment or generation supply can be calculated in advance, enabling the amalgamated avoided costs to be quickly introduced into the determination of maintenance costs and capital expenditures for capacity of distributed electric supply, which can be made available to third party qualified suppliers and customers of electric supply to install supply capacity (e.g. Distributed Generation, Electric Vehicles, renewables, electric supply feeders from another supply source). In one embodiment, an incentive based on this calculation of costs to increase capacity or elevate the reliability of service at a specific point in the electric grid can be used to support the determination of discounting existing non-firm loads or promoting migration of loads to non-firm load service status that can shut off at times of high congestion pricing/costs in the distribution system or equipment failures that might result in crisis management needs to reduce electricity usage to avoid additional equipment damage or other supply/demand imbalances. In one embodiment, this incentive is broadcasted electronically or through media to targeted firm delivery customers with options to modify their existing firm power requirements to make their load requirement non-firm through introduction of technology that can improve energy efficiency of these load source devices, or their electricity modulation capabilities. In one embodiment, the cost of non-firm power is equal to the commodity cost of electricity generated at the time of usage plus the electric losses of the generator that it has contracted to buy that power from without paying full costs for demand charges or generator capacity charges. In another embodiment, the cost of non-firm power is a negotiated rate between a system of the instant invention and the appliance or other load on an ongoing basis depending on the state of the distribution system where it connects to the load.

In another embodiment, the cost of non-firm power is auctioned off in tranches by a system of instant invention for each specific location in the grid. In another embodiment, non-firm power cost is a preset value for delivery costs and the load separately acquires commodity supply independently by itself or through an aggregator of loads. In another embodiment, the customer's demand charges are aligned with savings for non-firm power requirements. As an example, a customer who had 5 kW of firm power and no non-firm power paid full demand charges of delivery. With customer preference changes to non-firm power, the demand charge for delivery peak can be reduced by a percentage that equated to reduced capital expenditures on the electric grid due to the reduction in firm power requirements. In one embodiment, the $/kW for firm power can be a fixed savings going to this customer in reduced demand charges for delivery if switched to non-firm power.

In one embodiment, if a distributed generator is located in micro-zonal area associated with this customer load then electric losses calculated by a system of the instant invention to be paid by the customer can equate to zero. In one embodiment, a generator located in another microzonal location in the distribution system can obtain electric flow efficiency payments and/or congestion pricing payments as a result of relieving electric flow constraints in one area of the distribution system as it contractually supplies electricity generation to a customer in another microzonal location on the distribution system and gets compensated by a system of the instant invention for congestion pricing, capital equipment cost avoidance payments for providing the capability of deferring the building of new infrastructure, and reducing electric losses to go from one zone of supply of heavy usage to the customer's microzonal location in such a way as to reduce the burden on the heavily utilized portion of the distribution grid.

Injection points of distributed supply are critically important in determining the financial settlement of supply electricity in the distribution system.

Figure 3:
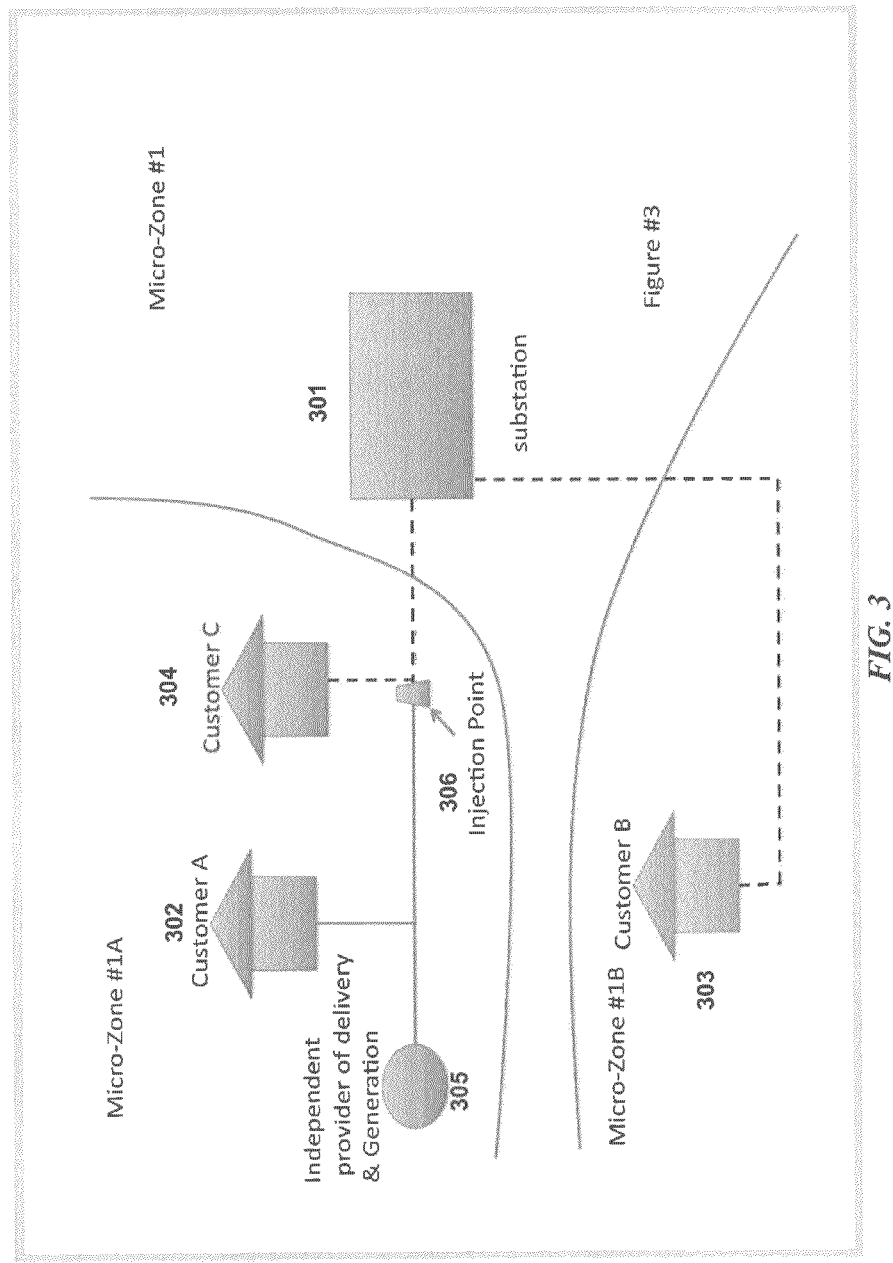
FIG. 3 illustrates yet another embodiment of the present invention.

FIG. 3 illustrates another embodiment of that instant invention having an independent supplier of electric distribution and generation (305) and its customer C with an injection point (306) where the independent electric supply and delivery provider (305) is connected to the public utility system managed by an Independent System Operator (ISO) or utility (301).

In one embodiment, the ISO maintains reliability from the Substation (301) to this injection point (306) at a set level (criteria) of calculated reliability for the injection point's reliability requirements. In some embodiments, such reliability criteria calculations can use deterministic or probability methods such as methods that are provided, for example, in Billinton, Roy. Reliability evaluation of power systems—ISBN 0-306-41450-3, whose disclosure of such deterministic or probability methods is incorporated hereinto in its entirety for this specific purpose. In one embodiment, the injection point (306) is the point of metering for the independent entity not subject to regulatory rate cases and the point of measurement for financial settlement. In one embodiment, the injection point (306) can provide delivery options of having available firm or non-firm power at a specified load level or supply level or both based on its contractual agreement with the ISO (301) or utility as well as an injection agreement where it might be used for support of deferral or avoided costs to the electric grid. In one embodiment, the injection point can be at the location of a Smart Node. In another embodiment, derivatives (i.e. futures, swaps, options) of firm and non-firm supply and load obligations are created by the system and provided for ISO and utility programs such as price response load programs or demand side management programs that are tailored for this specific region of the distribution grid at an injection point (Node), providing liquidity and efficiency in various ISO or energy market based programs. As shown in FIG. 3, Customer B (303) could purchase power from the independent entity (305) and can pay significantly less in losses and congestion pricing in the electric system if customer C (304) in combination with the existing electric grid was under high congestion pricing where the independent entity's power flows towards the substation (301) can result in reduced congestion pricing across the microzone #1A. In one embodiment, customers can never pay for firm electric service at higher levels then in other areas of the distribution grid, but such increased pricing paid to other parties such as distributed generation to support firm load requirements in the area can be socialized as an uplift cost to all distribution customers.

In another embodiment, the instant invention uses historical data to evaluate net financial benefits of measures to be taken for introduction of demand side management programs. In another embodiment, from this net financial benefit analysis, a system of the instant invention's Reliability Pricing Model (RPM) can set incentives to optimize the cost to maintaining/assuring a specified level of reliability in a region of the grid. In one specific example, non-firm delivery service (NFS) pricing/costing incentives are used where a load (e.g., a customer 304) may decide to opt-in to paying NFS costs given that the RPM set the non-firm delivery costs at only 20% of firm delivery costs in that specific region supplied by the utility that needs significant relief in terms of deferral costs for new capital investment or more vigilant real time operational responses to maintain a specific minimum level of reliability due to unforeseen real time operational needs such as equipment contingency.

In one embodiment, the historian function of a system of the instant invention is used for a rate case scenario generation through simulation of the electric grid to determine how potentially negotiated performance based rate making items and other clauses/incentives/penalties, such as a return on equity (ROE) and other financial indicators. In one embodiment, a system of the instant invention models the rate case implications to enterprise value and simulates scenarios to support the agreement of such rate cases. As one non-limiting example, with the historical observations of reliability and decisions made on failed equipment, maintenance expenditure levels on specific equipment, operational response time, tree trimming, coupled with predicted demand-response (non-firm versus firm load requests—or other derivatives of these core offerings such as for example demand response programs to reduce load up to 10 times a year when called for the monetary compensation equal to a generator capacity payment (real option payment to be available to reduce load due to a lack of committed generation supply)), a system of the instant invention can suggest accepting a higher performance penalty for failing to meet levels of reliability (e.g. SAIDI, CAIDI) to be traded against perhaps return on equity percentages or financial structure of debt versus equity.

SAIDI is the System Average Interruption Duration Index that is used as a reliability indicator by electric power utilities and calculated as the average outage duration for each customer served. SAIDI is measured in units of time, often minutes or hours. In one embodiment, SAIDI is measured over the course of a year. For example, according to IEEE Standard 1366-1998, the median value for North American utilities is approximately 1.50 hours.

CAIDI is the Customer Average Interruption Duration Index that is a reliability index used by electric power utilities. In one embodiment, CAIDI gives the average outage duration that any given customer would experience. In one embodiment, CAIDI can also be viewed as the average restoration time. In one embodiment, CAIDI is measured in units of time, often minutes or hours. In one embodiment, CAIDI is measured over the course of a year. For example, according to IEEE Standard 1366-1998 the median value for North American utilities is approximately 1.36 hours.

In one embodiment of a system of the instant invention a measurement of confidence that a performance based ratemaking (PBR) mechanism is obtainable through alteration of scenarios of actions in the field is provided as an output (e.g., $30 million reduction of Operation and maintenance (O&M) costs per year for five years results in a confidence level of 80% in year six that a PBR incentive will be achievable). In one embodiment of a system of the instant invention, the setting of budgets for capital expenses (CAPEX) and operation expenses (OPEX) can be an outcome of modeling the rate case agreement in concert with predicted outcomes of achieving performance metrics. In one embodiment, predicting outcomes of achieving performance metrics in one case can include a Risk Management System simulation from Dynamic Contingency Avoidance Management System (DCAMS—PCT/US2010/024955) simulations.

In one embodiment, whether customers or their appliances/equipment decide to accept demand response contracts or not, these load's financial costs and benefits can be characterized or derived by firm and non-firm definitions in some combination and traded using derivatives from these two types delivery services. For example, in a contractual obligation between one specific customer and the utility this customer may sign up for non-firm power for 1 kW for a specific load at its facility for a specific time period (e.g. three continuous years) and thus always be prepared to disconnect its energy asset from the system when signals are communicated to non-firm power in this region of the electric grid. In some embodiments, this load might then enter into a service supply arrangement with a third party load or generator wishing to also accept some level of unreliability by selling 1 kW of its power unavailability for up to two hours within a set time period which allows the initial customer's load that bought non-firm power to be allowed to miss a call to curtail its 1 kW load within this set time period and duration of two hours and not receive a penalty of not meeting its non-firm power obligations to the utility. In some embodiments, the selling of this derivative of not having to respond to calls to curtail say 1 kW of load for a specific time period can be created by a generator or a firm load participant who is willing to take calls of curtailment (for this two hour duration) at a given beginning set period of time (e.g. at 5 pm for date Jul. 30, 2020). In some embodiments, the scheduling, market making, settlement and acceptance of these contracts for a specific region, node or injection point within an electric grid would be managed by a system of the instant invention and presented to the ISO or utility in an amalgamated fashion for concurrence, approval, incorporation in operating and managing the distribution grid.

In one embodiment, a system of the instant invention provides a price responsive load program or demand response program of differentiated levels of acceptable reliability for a utility or independent operator whose customer can choose whether to participate in modifying reliability of service. In one embodiment, a customer can buy both firm and non-firm electricity at different peak levels of obligated service for a specific period of time, depending on the customer's choice and in some cases, based on grid's availability to provide such electricity. In one embodiment, a system of the instant invention enables the ISO to purchase the obligated service directly through electronic means from the appliance or energy asset.

Figure 4:
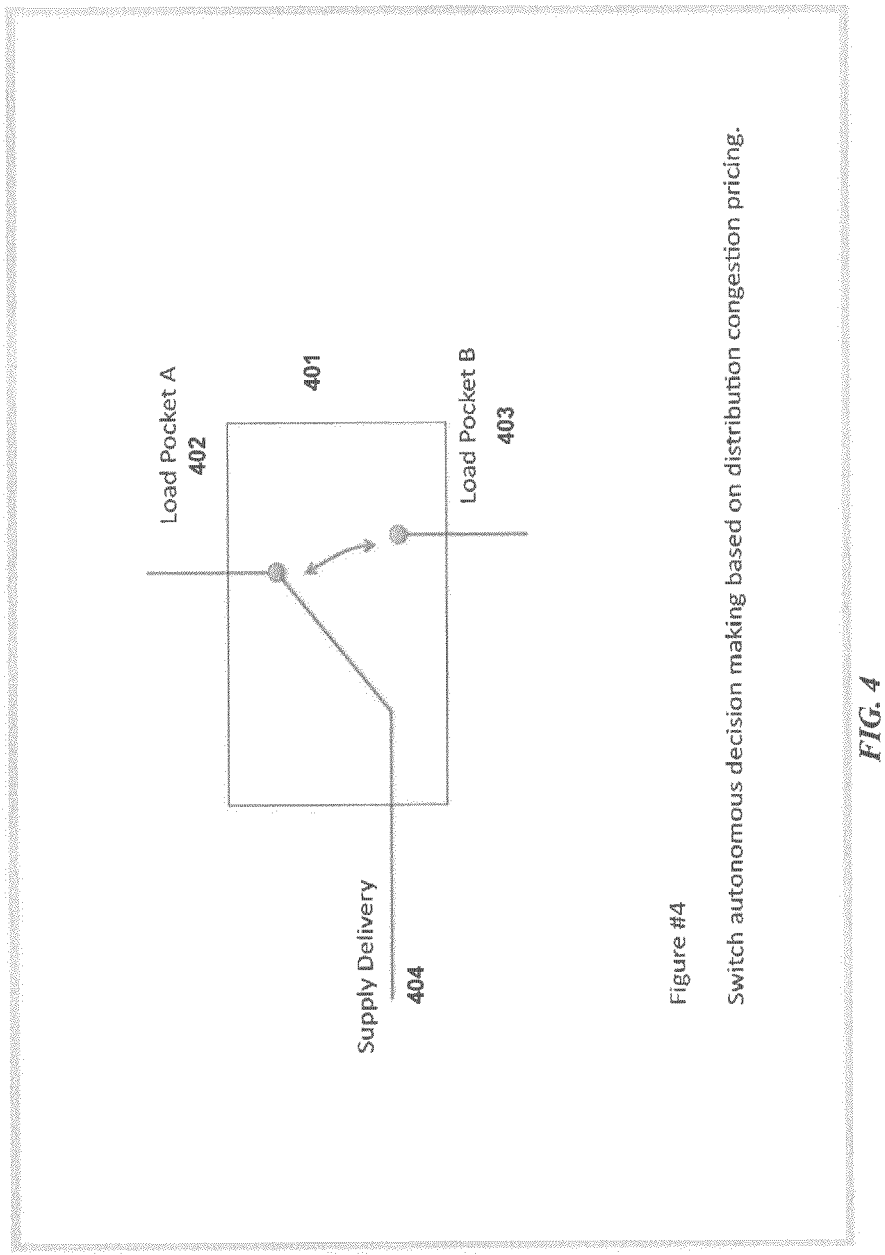
FIG. 4 illustrates yet another embodiment of the present invention.

In one embodiment of the instant invention, a distribution congestion pricing on a distribution system can be provided to switches in the distribution system. As shown in FIG. 4, in one embodiment, the instant invention is interoperated with a switch (401) that can supply two different load pockets (402, 403) with electrical energy. In some embodiment, the instant invention determines, based, for example but not limiting to, on congestion-based pricing (e.g., a pricing model that prices electricity based on peak demand factors) or a predicted pricing (e.g., pricing based on constrain(s) of supplying electricity with available generation to a requested load) or firm power capacity obligations, what position to place the switch (401) to feed a specific load (402 or 403), and at which times. In some embodiment, the instant invention determines the electricity supply factors, including price, timing, availability of non-firm load and other based at least in part on an optimization of the electric distribution grid delivery system (404) in terms of energy losses, energy supply efficiency, grid reliability considerations (e.g., equipment overloading durations to fall below specifications of acceptable operation).

In one non-limiting embodiment, a system of the instant invention determines the electric load requirement determined by a customer's preferences that it is willing to pay for such supply on a non-firm basis and a firm basis of supply and delivery services of electricity. In another embodiment, the electric distribution switch (401) is given autonomous control to modulate based on electric market firm/non-firm as well as commodity supply pricing of load pocket A (402) versus load pocket B (403), and/or the switches' (401) optimization function. In one embodiment, such optimization function causes action(s) that is/are communicated by the system to switches (401) in the field based on overall grid efficiency and reliability optimization that takes into consideration customers preferences of non-firm/firm commitments and commodity pricing. In another embodiment, the optimization function is embedded in the switch (401) itself and additionally contains a set of rules to actuate the switch (401) based at least in part on market pricing thresholds and/or differences in market pricing, either between the supply and the load or between the loads. In another embodiment, the optimization function for switch modulation includes factors of maintenance costs associated with such modulation. In another embodiment, reinforcement learning is used in the system of the instant invention or within the switch's (401) controller to learn through trial and error how best to optimize its value function for long term reward. In one embodiment, the historical function of the inventive system can calculate the total economic value of the switch (401) based at least in part on its optionality or savings as well as price changing capability when switching from one supply or load to another supply or load. In another embodiment, such economic value determination stems from the aggregation of value obtained across the switch (401) is used with attributes and quantifications to determine a potential value of adding additional switches to the electric grid where such value is determined to be available through its installation.

In one embodiment, the instant invention can perform resource planning and sets capital budgeting allocations for work to be performed on the system, and incentives provided to distributed resources such as energy storage and distributed generators in very specific locations and/or times. In some embodiments, short term and/or long term 1-3 year resource planning is performed for the distribution grid to determine the least cost solution to a capacity shortage and/or potential reliability concern by evaluating the cost effectiveness of deploying assets capable of being deployed within the short or long term time frame. In another embodiment, the instant invention provides a portfolio management engine to enable optimization of projects that can provide the biggest return in terms of improvements in reliability, costs, energy efficiency, environmental sustainability, while taking into consideration constraints such as time frames for installation and viability of a proposed solution.

In another embodiment, the instant invention allows an asset owner of an electric grid or a grid operator to calculate and/or forecast least cost upgrades to maintain standard reliability criteria based at least in part on customer preferences to reliability that they wish to pay for and minimum levels of reliability that must be maintained for the electric grid. Based at least in part on, for example, planned upgrades of the electric distribution grid, specific quantified potential avoided costs that may be saved based on the expected changes to the grid design basis (e.g. electric grid design basis changes such as moving customer load to other parts of the distribution feeder or network) in the system in terms of (increasing or decreasing firm and non-firm) loads on the system and adding generation supply on the system at specific locations (e.g. energy storage or say electric vehicle parking lots to attract storage in a particular area). In one embodiment, a system of the instant invention provides multi-year integrated resource planning for the planning of grid supply, energy efficiency, and reliability at every location on the grid based on customer's requirements for levels of reliability that they want to pay for. In some embodiments, the instant invention automatically performs, for example, one or more of the following functions:

i) calculation(s) of reliability at each node in the electric grid for operational use in making decisions in near real time;

ii) calculation(s) of criticality at each node in the electric grid for operational use in making decision in near real time;

iii) determination (a) by taking into consideration: a type of potential outage(s) as a result of a failure at a specific node, a time to respond to make repairs, a number of customers effected, a type of customers effected, generation supply lost, and load lost;

iv) measurement and calculation of expected maintenance repair for all components on the system through a historian function of work performed on the system;

v) forecasting levels of reliability at each node in the electric grid for the purposes of planning constraints on the system that may need a relief based on forecasted customer requirements for supply/delivery and the reliability of that supply/delivery;

vi) aggregating data on congestion pricing in the distribution system to support an energy efficiency analysis that determines value from relief of a congestion;

vii) measuring energy losses on the distribution and transmission system for each customer based on expected supply and delivery paths of electricity to this customer over a simulated timeframe;

viii) aggregating data on existing customers, their preferences of reliability, metering of past usage of electricity at various times (e.g. using automated meter infrastructure);

ix) aggregating data on existing customer's decision-making points to determine at what prices changes from base electric usage are observed to determine price elasticity of these loads to pricing;

x) developing uncertainty levels to the forecasted levels of reliability at each node;

xi) evaluating and/or suggesting solution set(s) to enable forecasted deficiencies in reliability to be improved;

xi) enabling operators and/or planners to choose solution set(s) that can also be developed by the operator or planner;

xii) evaluating cost-benefits to the various solution sets;

xiii) performing scenario generation from these chosen solution sets to unreliability and inefficiencies;

xiv) performing scenario generation for changes in forecasts based both on the quantified levels of uncertainty and from preset simulations of higher levels of uncertainty in the forecast.

Figure 5:
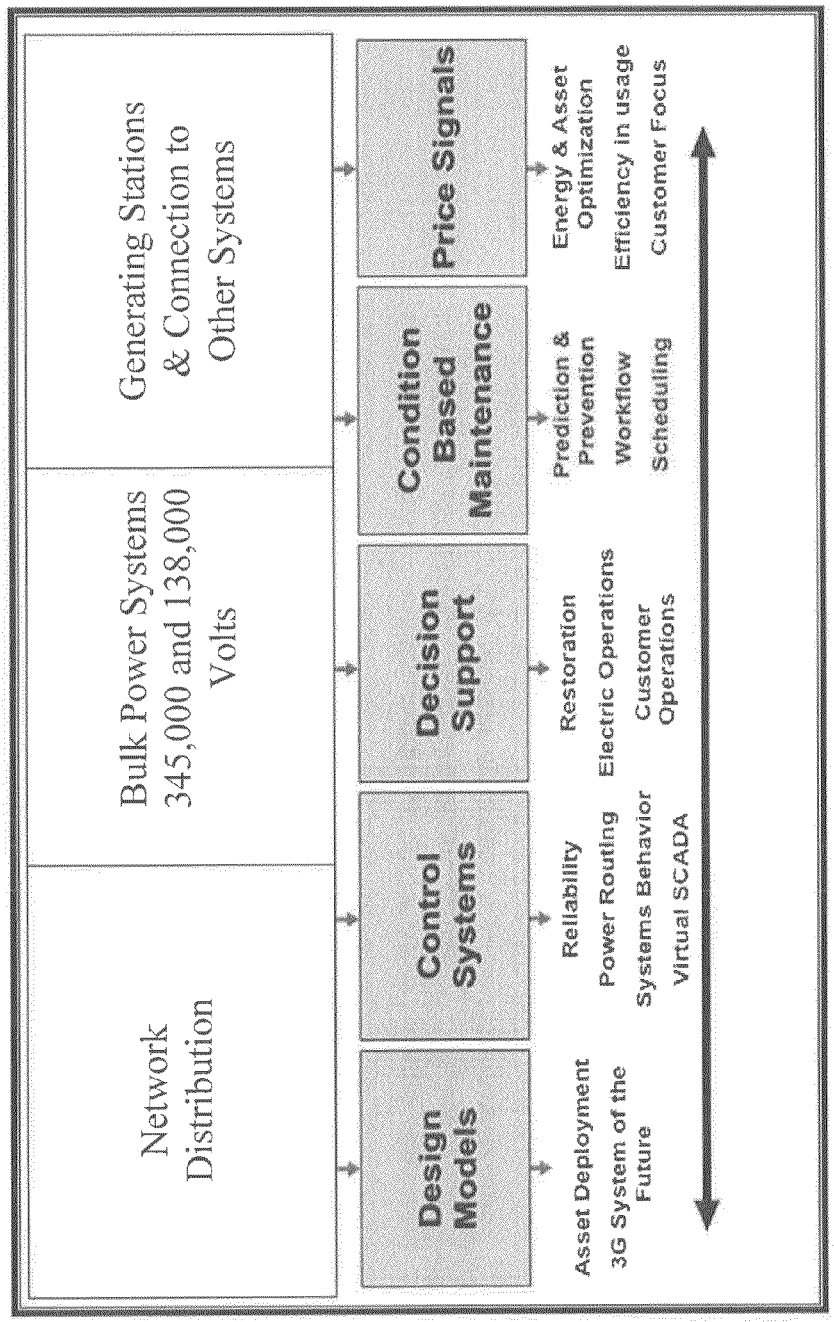
FIG. 5 illustrates yet another embodiment of the present invention.

In one embodiment, as shown in FIG. 5, the instant invention provides an integrated system model approach that enables the modeling framework, data retrieval and historical assessment to be used for both: 1) real time operations as well as 2) operational planning and longer term integrated resource planning such as energy & asset optimization and/or efficiency in usage. In one embodiment, a customer focus is obtainable through pricing indicators/signals.

In some embodiments, the instant invention, for example, provides quantified avoided costs as a result of a potential future load, either forecasted or requested, that requires firm electric service of electricity and results in the entire electric delivery system including new generation to be upgraded for its specific firm electric service requirements. In some embodiments, an electric grid operator, in order to meet a certain minimum level of reliability (e.g., LOLE (Loss of Load Expectation) of 0.1 outages in a two year period) based on rate case agreements and/((or other contractually agreed to thresholds (contingency based or probabilistic based reliability calculations being agreed to for measurement of minimum levels of reliability to customers—(e.g., single contingency provided at forecasted peak load)) or to prevent system damage or excessive costly degradation may determine that a specific enhancement is needed and that a least cost avoidance based on a non-participating rate payer impact method analysis of specific projects or a combination of projects and contractual agreements for say new generation can determine the seasonal or yearly costs to solve this particular deficiency.

In some embodiments, the instant invention may provide for a financial analysis that includes other calculations such as total resource costing analysis that includes environment considerations, and enterprise value creation, which includes returns on debt and shareholder equity, from such a project. In some embodiments, the instant invention provides for avoided costs analysis that can take into consideration central generation, transmission, substation, and/or distribution upgrade costs if all cost are determined as needed to be upgraded based on reliability analysis such as deterministic criteria (contingency planning) and/or probabilistic measurements of reliability criteria (e.g., calculated LOLE (e.g., a form of Monte Carlo analysis)) greater than 0.1 outage in 2 years as a result of failure of generation and electric cable capacity not meeting the load in the distribution system).

Illustrative Examples of how Load can Interface with the Response Manager of the Instant Invention Based at Least in Part on Conditions Changing in Real Time Scenario #1—Non-Firm Service for an Appliance 1) Sign-up 2) Preconditions:

a) there may be firm and non-firm electricity delivery and generation capacity (Non-Firm Service—NFS) that customers can buy, and utility tariffs available;

b) In some Embodiment there may be embedded firmware in appliances or Smart Nodes (combined electric switch, monitoring of connectivity and availability, and interval metering of electric usage) connected to loads (e.g. Roof Top Unit (RTU) Heating Ventilation Air Conditioning (HVAC)) to enable semi-autonomous discrete purchases of NFS for these appliances/loads, measurement and verification of electric usage, and modulation of operation (i.e. On/Off);

c) there may be 5 minute interval metering (AMI) to measure customer energy and demand;

d) customers may have the option to install, or have installed, NFS qualified Smart Nodes for their loads to shut off any and all power in their home or business or electric vehicle or specific load (may exist within the appliance or within the AMI); customers can have the store from which they purchased these appliances or Smart Node opt them out of demand side management (DSM) programs (both emergency and price responsive) therefore they need not have to program appliances or Smart Nodes; and e) Verizon or some other communication company enables the communication to all appliances—(e.g., broadband over power lines (BPL), wireless, etc.).

3) Exemplary process: when a customer enters their utility portal, an utility (e.g., Con Edison) can identify the customer's home intranet address with his or her CIS (customer information system) account. In some embodiments, the identification tags the customer's exact location with an electric service point. In some embodiments, the customer can read off unique numbers from the appliance or Smart Node (e.g., Switch with/without metering) indicating that this purchased appliance/load is compliant for NFS or perhaps the appliance/load will be self recognized by the customer's home wireless network and/or made available to the customer to choose off a list of available appliances in his or her home. In some embodiments, there may be a request to have the customer verify manual control capability over their appliance (testing procedure for verification of DSM functionality). In some embodiments, the instant invention provide the customer with a menu of options that are calculated to save energy and/or money for being price responsive in the area that the appliance/load is located within the electric grid. In some embodiments, the instant invention provide the customer with a menu of options that are calculated to present the customer with options to save energy and/or money for replacement of existing appliance/load as part of an energy efficiency appliance or load rebate program for this specific location within the electric grid. As one specific example, the customer may request connecting a Smart Node to make an existing RTU HVAC unit into a non-firm load to save on the total cost of energy, but the customer portal would also provide the option to replace this specific old load with a new high efficiency Energy Star rated RTU HVAC with a monetary rebate provided by the utility and a solution set to have this unit replaced by a third party contractor.

Option 1

In some embodiments, the customer is offered the choice of service reliability for the appliance. In some embodiments, customer chooses to buy NFS for this appliance/load. In some embodiments, under this choice of lower levels of reliability, the following can be provided.

a) The utility provides no assurance that delivery will be available—e.g. 10% savings on electric delivery costs (kWh) and demand component (kW peak) 20% of normal cost are provided to the customer for this appliance/load/plug-in electric vehicle.

b) The utility provides no assurance that generation capacity will be available—e.g. 2% savings for real time generation costs and 98% savings on demand cost associated with generation capacity (i.e., installed capacity (ICAP) for generation supply). For example, the New York Installed Capacity (ICAP) market is based on the obligation placed on load serving entities (LSEs) to procure ICAP to meet minimum requirements. In one example, the requirements are determined by forecasting each LSE's contribution to its transmission district peak load, plus an additional amount to cover the Installed Reserve Margin. The amount of capacity that each supplying resource is qualified to provide to the New York Control Area (NYCA) is determined by an Unforced Capacity (UCAP) methodology. NYISO ICAP auctions are designed to accommodate LSEs and suppliers' efforts to enter into UCAP transactions.

c) The utility provides choice for regulation service. If customer agrees and an appliance is programmed so that it can now also to be used as an ancillary service for regulation and frequency response service (for continuous balancing of resources with a control area and associated control area interchange);

d) The price/kWh of commodity and delivery will vary according to scarce resources given supply and demand. In some embodiment, assurances of never to exceed the cost of tradition firm service may be an option to enter into at a lower savings rate so as to guarantee that the customer will always be a winner for entering into this program. In some embodiment, subsidized through perhaps uplift spread to all customers. In some embodiment, an option to not pay more than a specific price/kWh for real time delivery and supply of electricity is also provided.

Option 2—Emergency Curtailment Program (Automatically Enrolled when Found on the Home Area Network if No Opt-Out.)

If Option 1 is not acceptable and customer does not opt out of Option 2, a customer will receive rebates associated with emergency response programs (e.g. NYISO's Emergency Demand Response Program) and will receive payments associated with curtailment for delivery related events down to the distribution level. In some embodiment, some deviations are allowed like missing the first or second call to curtail in a 12 month duration. In some embodiment, these various contracts, determined by a system of the instant invention show up on their electric bill as a rebate or additional cost/penalty.

Option 3:

Enable home/building energy management functions for consumer led modulation.

Another Example: Control Room Modulation of Load

Preconditions:

a) Numerous customers signed up for Option 1. Customer appliances set by the customer via a customer portal to shut off when total price of delivery is above $120-200/MWh depending on the customer. AMI capable of differentiating NFS load from other load providing verification of modulation.

b) Customers signed up for Option 2.

Exemplary Process:

1) The CALM Risk Management System determines risk on the system due to equipment failure from over use.

2) RPM reduces this portion of the distribution systems capability to supply load, which results in real time and day ahead energy prices for this effected region to reflect scarcity of supply and delivery (congestion pricing). Price raises to $150/kWh, calculated as a predicted response.

3) Customer appliances with setpoints below $150/kWh shut off.

4) The instant invention sees a slight decrease in usage as expected.

5) Additional transmission related incidents cause supply restrictions in this load pocket of these appliances.

6) RPM creates additional supply restrictions for this entire region, but since congestion is now bottlenecked at the transmission incident location, local distribution costs have not gone up further.

7) A transformer feeding this microzonal area goes off line.

8) The RPM creates additional supply restriction for distribution, which raises prices to $250/kWh due to competitive bidding of load and supply for this microzone.

9) The instant invention sees a significant decrease in usage as was predicted from scenarios and historical observations.

10) Additional emergency considerations require an "all hands" response and Response Manager (RM) initiates curtailment of Option 2 participants.

11) RM initiates automated customer calls to plead for load curtailment.

12) RM dispatches field crews to knock on doors to plead for curtailment based on prioritized list of customers in the effected area. List of customers prioritized by such things as the type of customer (e.g. cleaners, telephone central office, residential customer), the anticipated or real time load of the customer, the past history of whether that customer manually curtailed when pleaded to curtail, the expected availability and thus associated response of that customer, prediction of a customer class responding based on data mining.

13) Verification is obtained indicating curtailment from NFS appliances and other NFS loads that were operational at the time of curtailment or price setting.

14) Event mitigated and system returns to normal.

15) Billing gets modified to show load support in dealing with such an incident.

Another Example: Air Conditioning Control

In some embodiment, the instant invention provides for a utility managed program to control customer air conditioning through the deployment of third party thermostats. In some embodiments, the utility can be in the better position to manage demand response (DR) for the benefit of its system while still supporting the competitive market place.

In some embodiment, the instant invention provides for an energy interoperational standardization by OASIS by enabling a utility managed Demand Response system based on the methodology of non-firm electric load through an energy management system-demand response of the instant invention (EMS-DR). In some embodiment, the EMS-DR provides a gateway at the customer facility or embedded in electric appliances or loads (referred to as Electric Grid Optimization (EGO) system) to determine reliability and pricing at the utility. In some embodiment, the instant invention bypasses the need for third party aggregators by providing fully electronic sign-up and management of these loads as part of a utility managed DR program. In some embodiment, the appliance or load's Smart Node will communicate time stamped metering data of load and/or electric shut-off switch position to the system before and after system requests for non-firm load curtailment in order to provide measurement and verification of the load removed from the electric grid. In some embodiment, Non-Firm electric service (NFS) is where a specific load like an appliance enters in to arrangement to only take electric supply from the grid if allowed by the optimization/constraint decision engine of the EGO. In some embodiment, the instant invention uses the OASIS (Organization for the Advancement of Structured Information Standard) (Also referred to as OpenADR) as a means of communicating standardized XML messaging and web services between the appliance, load, smart node or gateway and the system. In some embodiments, appliances or Smart Nodes provide alerts, alarms, or notifications of malfunctions that could prevent the removal of load from the electric grid in a timely fashion (e.g. a fan needs to continue to run because a safety system associated with the load was initiated to prevent overheating of the load's mechanical system or system is unresponsive to control requests to shut off).

In some embodiment, there is no need for an AMI infrastructure as load flow at the appliance or load level is measured through the appliance's own approved flow measurement or its on and off status of using electricity, or where the load or appliance is of known fixed electric usage based on its design basis. In some embodiment, there is no need for a complicated baseline load calculation such as Customer Baseline Load (CBL) calculations as its based on real option valuation of not paying for generation capacity and therefore can only use electricity when given explicit authority to draw power from the electric grid when there is sufficient excess generation capacity and/or delivery capacity. In some embodiment, by having continuous or near continuous energy interoperability via existing communication protocols and paths, measurement and verification is guaranteed with a simple—is it on or is it off—for emergency situations when supply is in short supply such as when the wind stops blowing unexpectedly and wind generation is therefore not available. In some embodiment, the instant invention can determine in real time or day ahead that supply and delivery capacity is available in abundance to allow that load to take electric supply from the grid. In some embodiment, under a NFS, there are no maximum number of calls or denials or lack of permissions to have this contracted electric load reduce it's usage of power.

In some embodiment, the instant invention can implement EMS-DR software platform that employs Internet cloud storage and computing functionalities. In some embodiment, the instant invention allows customers to simply choose to participate without an aggregator, through a self service platform software.

In some embodiment, the instant invention can incorporates features such as self service automation capabilities for coordination and notifications, forecasting usage, limiting demand charges, planning and implementing energy efficiency, security, lighting control, video, etc. In some embodiment, the instant invention can incorporates sharing of control of amalgamated loads. In one specific example, there may be four RTU HVAC units under on control scheme and any one of the four may be interchangeably considered the unit that is under NFS.

In some embodiment, the instant invention can provide an on-site gateway that can include existing Wi-Fi, mesh networks such as Z-Wave/Zigbee, and other networking capabilities without necessarily having to go through a meter. In some embodiment, the instant invention can provide, for customers who sign up their loads and appliances, smaller loads that can be included in program with measurement and verification (M&V) via the device itself.

In some embodiment, the instant invention can provide for a delivery of a computing platform and solution stack as a service (PaaS) that enables underserved small and medium size businesses to inexpensively participate in demand response programs through manual orchestration of tasks and installation of automation for specific equipment (air conditioning, major equipment, lighting), while managing electric usage to minimize electric bills.

In some embodiment, the instant invention can provide through PaaS at least the following functionalities to customers of an utility:

1. Self service participation in demand response programs;
2. Self service control of assets and M&V to support DR participation;
3. Self service load and supply platform decision support to manage energy costs based on forecasts; and/or
4. Self service integration of security, lighting, comfort.

In some embodiment, the instant invention can provide system operators (e.g., grid operators) with verifiable, repeatable, and sustainable source of demand response.

Figure 6:
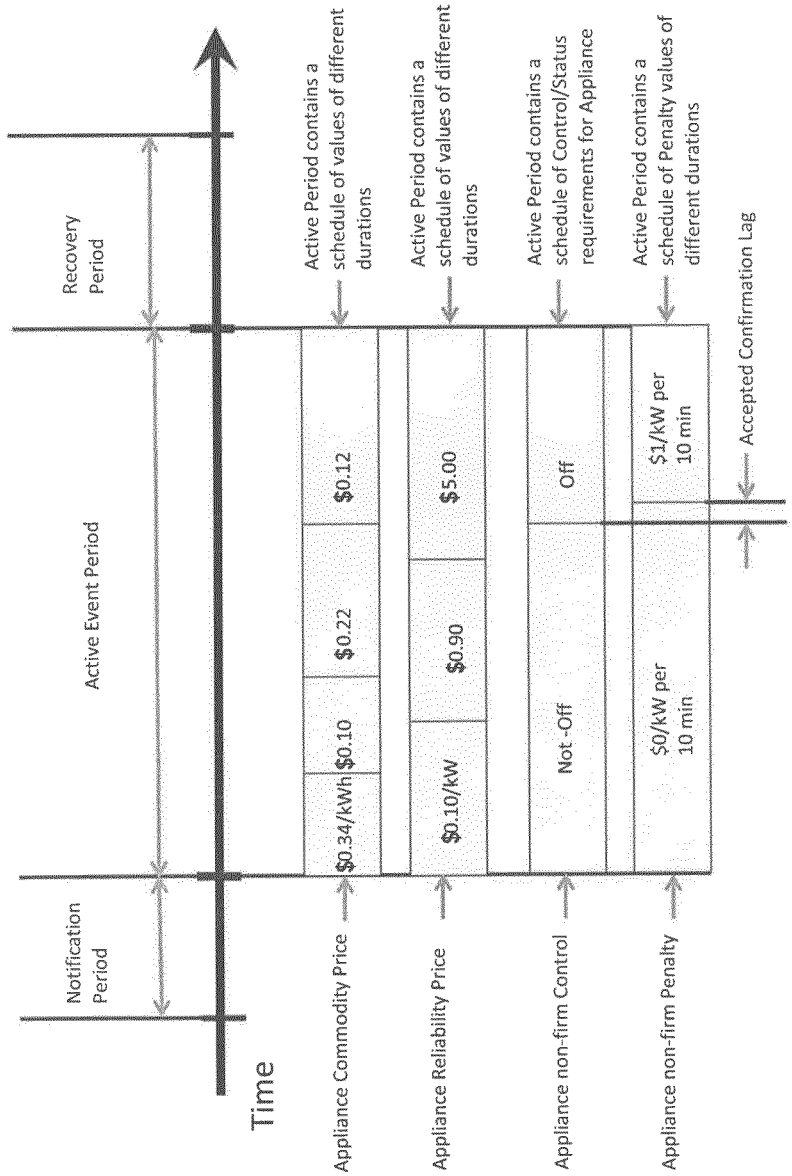
FIG. 6 illustrates yet another embodiment of the present invention.

As illustrated in FIG. 6, in some embodiments, the instant invention provides for a non-firm control mechanism that is based on real option valuation of available assets to transform (e.g., generator (gas/electric)/transformer) and deliver (e.g., cable) electricity without paying the full cost for a market capacity payment and/or tariff based demand payment from this device. As illustrated in FIG. 6, in accordance with some embodiments of the instant invention, an appliance or load is in continuous communication with an energy market by periodic polling and exception reporting. As illustrated in FIG. 6, in accordance with some embodiments of the instant invention, a penalty is enforced upon not turning off when a curtail signal sent because of unavailability of delivery and/or transform assets.

As illustrated in FIG. 6, in accordance with some embodiments of the instant invention, a control mechanism (e.g., On-Off) in the appliance or connected to the appliance or load for load reduction is tested to meet performance measurement and switching (e.g., On-Off) ability upon receiving a control signal.

As illustrated in FIG. 6, in accordance with some embodiments of the instant invention, the control mechanism can be in a separate switch (e.g., Smart Node) (not in the load/appliance) to reduce load. In some embodiments, the instant invention can provide for testing the separate switch to confirm that it meets performance measurement(s). In some embodiment, non-firm load is continuously monitored and tracked by the EGO to determine its present usage. In some embodiment, NFS monitoring is performed electronically through watchdog timer configuration where the system is continuously listening for the appliance on its reporting of status. In some embodiment, continuous status update(s) of being operational and/or in a specific state (e.g., On/Off) provide(s) assurance of the appliance or load always being vigilant to switch off if requested by the system. In some embodiment, the system would also request period or random status requests from the appliance for continuous monitoring and perform tested communication signals to the appliance to indicate that if fully requested the switch would modulate as requested to shutdown or turn off. In some embodiment, a tested communication signal for handshaking of availability and health in acting in a timely fashion would provide assurance of being able to act as a non-firm load. In some embodiment, the NFS Smart Node or smart appliance receiving NFS must request continuous approval to draw power from the grid and if communication fails to provide approval by the system within a predetermined timeframe the Smart Node or Smart Appliance must shut-off until it is again given permission, via its request, to draw power from the grid. In some embodiment, the Smart Node of the Load or appliance has a monitoring capability to determine the impedance, voltage supply, vampire load, or signature electric partial discharge of the load or appliance to determine if the load is connected to the electric grid or reconnected elsewhere on the electric grid without the Smart Node. In some embodiment, the load's Smart Node microprocessor will contain the equivalent of a "dead man's switch" in shutting off power to the appliance if communication to the system is lost for over a specific period of time (e.g. half hour), thus maintaining a fail safe mode of removing the appliance from drawing load unless given periodic unsolicited electronic permission from the system to continue to obtain supply from the electric grid.

Figure 7:
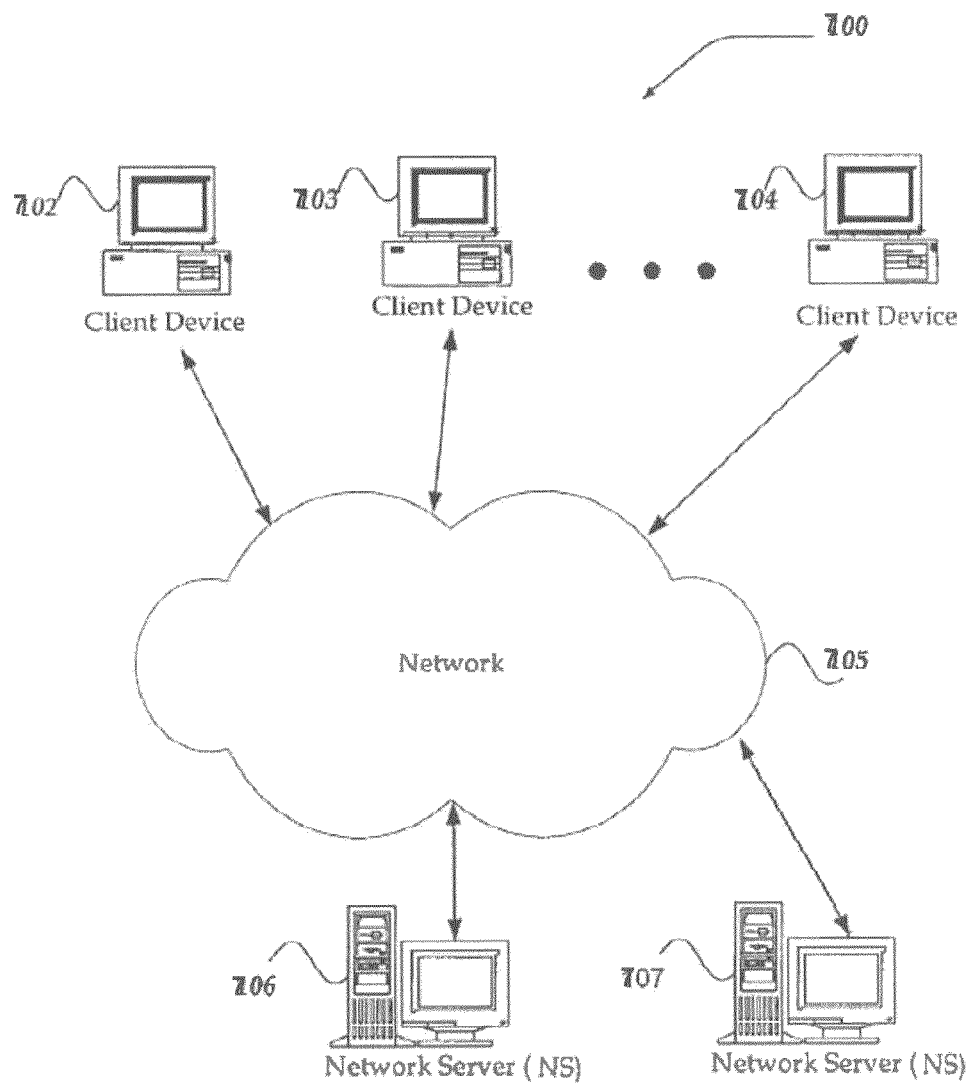
FIG. 7 illustrates yet another embodiment of the present invention.

Examples of Operational Implementations in Accordance with the Some Embodiments of the Instant Invention FIG. 7 illustrates one operational implementation of the present invention. However, not all of these components may be required to practice the invention, and variations in the arrangement and type of the components may be made without departing from the spirit or scope of the invention. In some embodiment, the system hosts a large number of members and concurrent transactions. In other embodiments, the system is based on a scalable computer and network architecture that incorporates varies strategies for assessing the data, caching, searching, and database connection pooling. An example of the scalable architecture is an architecture that is capable of operating multiple servers.

In embodiments, client devices 702-704 include virtually any computing device capable of receiving and sending a message over a network, such as network 705, to and from another computing device, such as servers 706 and 707, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 702-704 are any device that is capable of connecting using a wired or wireless communication medium such as a PDA, POCKET PC, wearable computer, and any other device that is equipped to communicate over a wired and/or wireless communication medium.

In embodiments, each client device within client devices 702-704 includes a browser application that is configured to receive and to send web pages, and the like. In embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, The Investor Network is programmed in either Java or .Net. In embodiments, client devices 102-104 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 705 is configured to couple one computing device to another computing device to enable them to communicate. In embodiments, network 705 is enabled to employ any form of computer readable media for communicating information from one electronic device to another. Also, in embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another. Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 705 includes any communication method by which information may travel between client devices 702-704, and servers 706 and 707.

Figure 8:
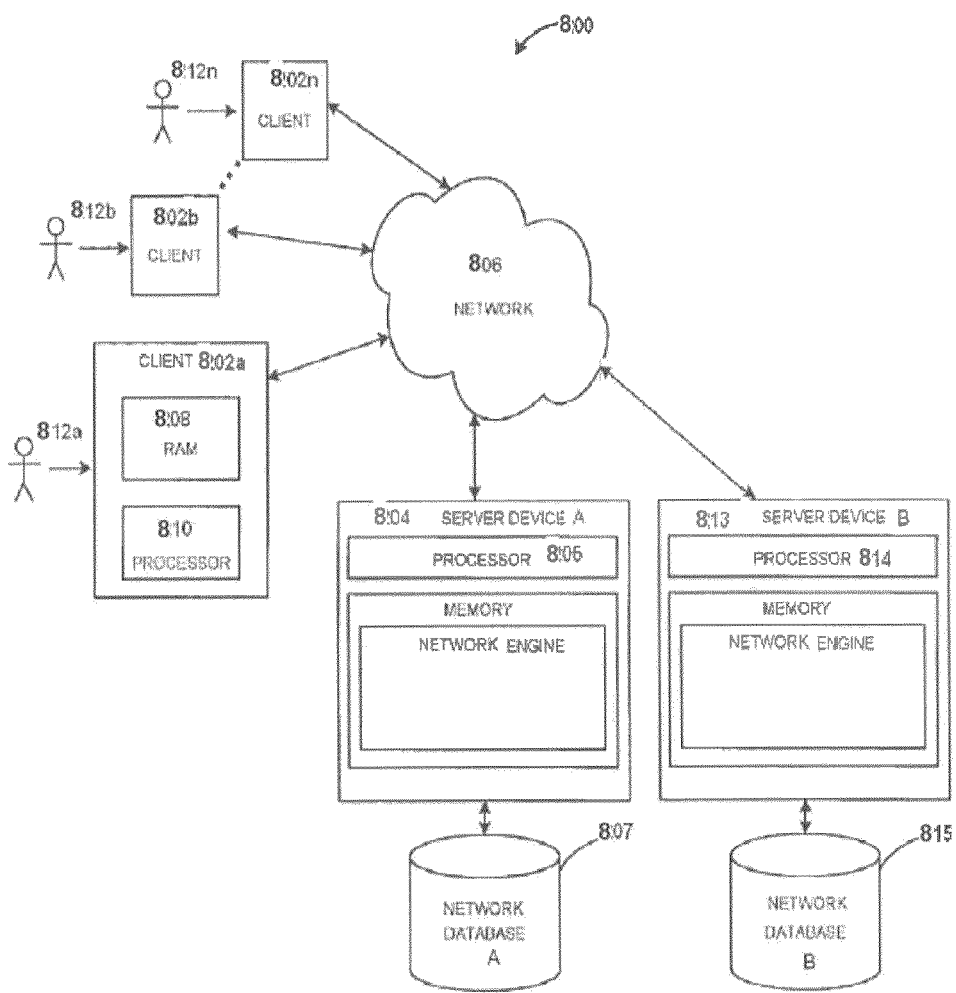
FIG. 8 illustrates yet another embodiment of the present invention.

FIG. 8 shows another exemplary embodiment of the operational implementation of the present invention. The client devices 802a, 802b thru 802n shown each comprises a computer-readable medium, such as a random access memory (RAM) 808 coupled to a processor 810. The processor 810 executes computer-executable program instructions stored in memory 808. Such processors comprise a microprocessor, an ASIC, and state machines. Such processors comprise, or are be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 810 of client 802a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer programming language, including, for example, C, C++, C#, Visual Basic, Java, Python, Perl, and JavaScript.

Client devices 802a-n also comprise a number of external or internal devices such as a mouse, a CD-ROM, DVD, a keyboard, a display, or other input or output devices. Examples of client devices 802a-n are personal computers, digital assistants, personal digital assistants, cellular phones, mobile phones, smart phones, pagers, digital tablets, laptop computers, Internet appliances, and other processor-based devices. In general, a client device 802a are be any type of processor-based platform that is connected to a network 806 and that interacts with one or more application programs. Client devices 802a-n operate on any operating system capable of supporting a browser or browser-enabled application, such as Microsoft™, Windows™, or Linux. The client devices 802a-n shown include, for example, personal computers executing a browser application program such as Microsoft Corporation's Internet Explorer™, Apple Computer, Inc.'s Safari™, Mozilla Firefox, and Opera. Through the client devices 802a-n participants 812a-n communicate over the network 806 with the system. As shown in FIG. 8, server devices 804 and 813 are also coupled to the network 806.

For the purposes of this disclosure, a computer readable medium is a medium that stores computer data/instructions in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer system(s), computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

In some embodiments, the instant invention includes a computer-implemented method that includes at least the following steps of: receiving, by a computer system, first load data for at least one first load, where the at least one first load is associated with at least one first smart node that controls a flow of electricity from an electrical distribution grid to the at least one first load; receiving, by a computer system, second load data for at least one second load where the at least one second load is associated with at least one second smart node that controls the flow of electricity from the electrical distribution grid to the at least one second load; where the first and the second load data that includes a service type indication; where the service type indication identifies whether the at least one first and second load receive in a non-firm electricity service, a firm electricity service, or both, where the non-firm electricity service is based at least in part on a non-firm service supply arrangement associated with each load and at least one supplier of electricity, where the non-firm service supply arrangement defines electricity usage based at least in part on at least one reliability level of the electrical supply provided by the at least one supplier of electricity without at least one guaranteed level of uninterrupted electricity supply, where the at least one reliability level of the electrical supply is based at least in part on an ability to instruct, by the computer system, to reduce or shut off the electricity supply from the electrical distribution grid in accordance with the non-firm service supply arrangement; where the firm electricity service is based at least in part on a firm service supply arrangement associated with each load and the at least one supplier of electricity, and where the firm service supply agreement defines the guaranteed level of uninterrupted electricity supply provided by the at least one supplier of electricity to each associated load; determining, by the computer system, electricity demand over at least one electric grid; optimizing, by the computer system, the electricity demand over at least one electric grid by adjusting the electricity supply to the at least one first load and the at least one second load based at least in part on a plurality of the following: i) the first load data, ii) the second load data; iii) the electricity demand, iv) the service type indication, v) the at least one reliability level of the electrical supply defined by the non-firm service supply arrangement, and vi) the at least one guaranteed level of uninterrupted electricity supply defined by the firm service supply arrangement.

In some embodiments, the at least one first smart node and the at least one second smart mode are electrical switches.

In some embodiments, the non-firm service supply arrangement is a contract. In some embodiments, the firm service supply arrangement is a contract.

In some embodiments, the at least one first load can participate in the non-firm service supply arrangement to receives the non-firm electricity service during at least one first portion of a time period and can participate in the firm service supply arrangement to receives the firm electricity service during at least one second portion of the time period.

In some embodiments, the at least one second load can participate in the non-firm service supply arrangement to receives the non-firm electricity service during the time period.

In some embodiments, the at least one reliability level of the non-firm service supply arrangement is calculated, by the computer system, by deterministic or probability calculations based at least in part on one of the following criteria: i) supplier historical data of the electricity demand of the at least one supplier of electricity; ii) first load historical data for the at least one first load data; and iii) second load historical data for the at least one second load.

In some embodiments, the inventive methods further include at least the following steps of: receiving, by the computer system, supplier data about at least one supplier cost associated with the electricity supply provided by the at least one supplier of electricity; receiving, by the computer system, electricity market data about at least one market cost of electricity; and calculating, by the computer system, at least one price for the at least one reliability level of the non-firm service supply arrangement based at least in part on the at least one supplier cost in the received supplier data and the at least one market cost in the received market data.

In some embodiments, the at least one second load participates in the firm service supply arrangement to receives the firm electricity service during the time period and the at least one first load and the at least one second load participate in an arrangement by which the at least one first load receives the electricity supply intended for the at least one second load during at least one first portion of the time period when the at least one first smart node is instructed to reduce or shut off the electricity supply from the electrical distribution grid of the at least one supplier of electricity to the at least one first load in accordance with the non-firm service supply arrangement.

In some embodiments, the instant invention includes a computer system where the computer system includes at least the following components: a) memory having at least one region for storing computer executable program code; and b) at least one processor for executing the computer executable program code stored in the memory, where the computer executable program code that at least includes the following code: code to receive first load data for at least one first load, where the at least one first load is associated with at least one first smart node that controls a flow of electricity from an electrical distribution grid to the at least one first load; code to receive second load data for at least one second load where the at least one second load is associated with at least one second smart node that controls the flow of electricity from the electrical distribution grid to the at least one second load; where the first and the second load data that includes a service type indication; where the service type indication identifies whether the at least one first and second load receive in a non-firm electricity service, a firm electricity service, or both, where the non-firm electricity service is based at least in part on a non-firm service supply arrangement associated with each load and at least one supplier of electricity, where the non-firm service supply arrangement defines electricity usage based at least in part on at least one reliability level of the electrical supply provided by the at least one supplier of electricity without at least one guaranteed level of uninterrupted electricity supply, where the at least one reliability level of the electrical supply is based at least in part on an ability to instruct, by the computer system, to reduce or shut off the electricity supply from the electrical distribution grid in accordance with the non-firm service supply arrangement; where the firm electricity service is based at least in part on a firm service supply arrangement associated with each load and the at least one supplier of electricity, and where the firm service supply agreement defines the guaranteed level of uninterrupted electricity supply provided by the at least one supplier of electricity to each associated load; code to determine electricity demand over at least one electric grid; code to optimize the electricity demand over at least one electric grid by adjusting the electricity supply to the at least one first load and the at least one second load based at least in part on a plurality of the following: i) the first load data, ii) the second load data; iii) the electricity demand, iv) the service type indication, v) the at least one reliability level of the electrical supply defined by the non-firm service supply arrangement, and vi) the at least one guaranteed level of uninterrupted electricity supply defined by the firm service supply arrangement.

Figure 9:
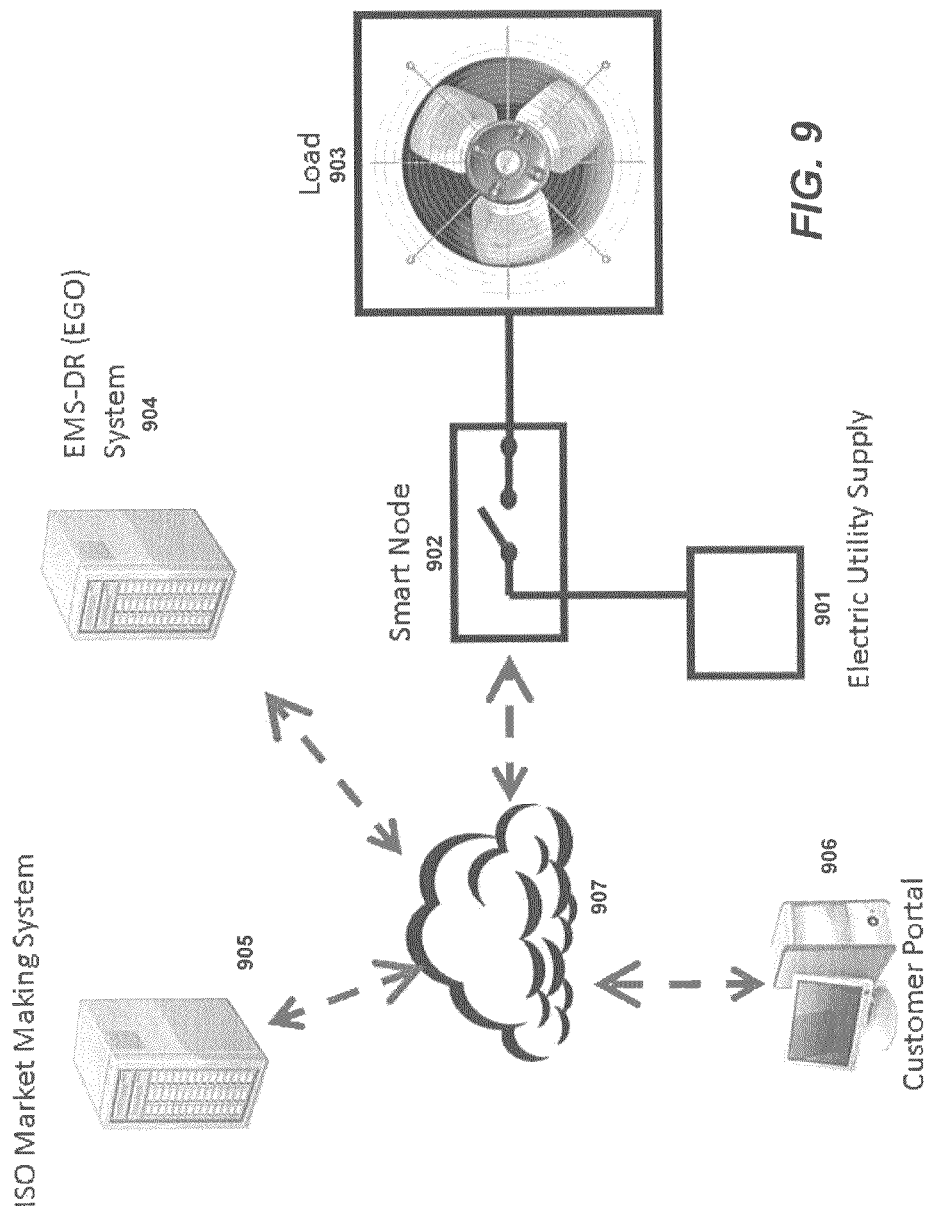
FIG. 9 illustrates yet another embodiment of the present invention.

FIG. 9 shows another exemplary embodiment of the operational implementation of the present invention. As illustrated in FIG. 9, in some embodiments, a customer who controls a load (903) uses a customer portal (906) to choose what type of service supply arrangement (non-firm, firm, or both) that the customer wants the load (903) to have with an electrical utility supplier (901). In some embodiments, the load and customer specific information received by the custom portal (906) can be electronically communicated (e.g, the Internet cloud computing (907)) to a Smart Node switch (902). In some embodiments, the customer and/or the Smart Node (902) as being periodically or constantly updated with electricity pricing information from, for example, an ISO market making system (905). In some embodiments, the customer receives status information about electric grid demand and/or instructions for the load (903) from the EMS-DR (EGO) system (904).

While a number of embodiments of the present invention have been described, it is understood that these embodiments are illustrative only, and not restrictive, and that many modifications may become apparent to those of ordinary skill in the art. For example, certain methods may be "computer implementable" or "computer implemented." In this regard, it is noted that while such methods can be implemented using a computer, the methods do not necessarily have to be implemented using a computer. Also, to the extent that such methods are implemented using a computer, not every step must necessarily be implemented using a computer. Further, any steps described herein may be carried out in any desired order (and any steps may be added and/or deleted).

What is claimed is:

1. A computer-implemented method, comprising:
    receiving, by a computer system, first load data for at least one first load, wherein the at least one first load is associated with at least one first smart node that controls a flow of electricity from an electrical distribution grid to the at least one first load;
    receiving, by a computer system, second load data for at least one second load wherein the at least one second load is associated with at least one second smart node that controls the flow of electricity from the electrical distribution grid to the at least one second load;
    wherein the first and the second load data comprising a service type indication;
    wherein the service type indication identifies whether the at least one first and second load receive in a non-firm electricity service, a firm electricity service, or both,
    wherein the non-firm electricity service is based at least in part on a non-firm service supply arrangement associated with each load and at least one supplier of electricity,
    wherein the non-firm service supply arrangement defines electricity usage based at least in part on at least one reliability level of the electrical supply provided by the at least one supplier of electricity without at least one guaranteed level of uninterrupted electricity supply, wherein the at least one reliability level of the electrical supply is based at least in part on an ability to instruct, by the computer system, to reduce or shut off the electricity supply from the electrical distribution grid in accordance with the non-firm service supply arrangement;
    wherein the firm electricity service is based at least in part on a firm service supply arrangement associated with each load and the at least one supplier of electricity, and
    wherein the firm service supply agreement defines the guaranteed level of uninterrupted electricity supply provided by the at least one supplier of electricity to each associated load;
    determining, by the computer system, electricity demand over at least one electric grid; and
    optimizing, by the computer system, the electricity demand over at least one electric grid by adjusting the electricity supply to the at least one first load and the at least one second load based at least in part on a plurality of the following:
        i) the first load data, ii) the second load data;
iii) the electricity demand,
iv) the service type indication,
v) the at least one reliability level of the electrical supply defined by the non-firm service supply arrangement, and
vi) the at least one guaranteed level of uninterrupted electricity supply defined by the firm service supply arrangement.

2. The method of claim 1, wherein the at least one first smart node and the at least one second smart mode are electrical switches.

3. The method of claim 1, wherein the non-firm service supply arrangement is a contract.

4. The method of claim 1, wherein the firm service supply arrangement is a contract.

5. The method of claim 1, wherein the at least one first load participates in the non-firm service supply arrangement to receives the non-firm electricity service during at least one first portion of a time period and participates in the firm service supply arrangement to receives the firm electricity service during at least one second portion of the time period.

6. The method of claim 5, wherein the at least one second load participates in the non-firm service supply arrangement to receives the non-firm electricity service during the time period.

7. The method of claim 1, wherein the at least one reliability level of the non-firm service supply arrangement is calculated, by the computer system, by deterministic or probability calculations based at least in part on one of the following criteria:
i) supplier historical data of the electricity demand of the at least one supplier of electricity;
ii) first load historical data for the at least one first load data; and
iii) second load historical data for the at least one second load.

8. The method of claim 1, wherein the method further comprising:
receiving, by the computer system, supplier data about at least one supplier cost associated with the electricity supply provided by the at least one supplier of electricity;
receiving, by the computer system, electricity market data about at least one market cost of electricity; and
calculating, by the computer system, at least one price for the at least one reliability level of the non-firm service supply arrangement based at least in part on the at least one supplier cost in the received supplier data and the at least one market cost in the received market data.

9. The method of claim 5, wherein the at least one second load participates in the firm service supply arrangement to receives the firm electricity service during the time period and the at least one first load and the at least one second load participate in an arrangement by which the at least one first load receives the electricity supply intended for the at least one second load during at least one first portion of the time period when the at least one first smart node is instructed to reduce or shut off the electricity supply from the electrical distribution grid of the at least one supplier of electricity to the at least one first load in accordance with the non-firm service supply arrangement.

10. A computer system, comprising:
a) memory having at least one region for storing computer executable program code; and
b) at least one processor for executing the computer executable program code stored in the memory, wherein the computer executable program code comprising:
code to receive first load data for at least one first load, wherein the at least one first load is associated with at least one first smart node that controls a flow of electricity from an electrical distribution grid to the at least one first load;
code to receive second load data for at least one second load wherein the at least one second load is associated with at least one second smart node that controls the flow of electricity from the electrical distribution grid to the at least one second load;
wherein the first and the second load data comprising a service type indication;
wherein the service type indication identifies whether the at least one first and second load receive in a non-firm electricity service, a firm electricity service, or both,
wherein the non-firm electricity service is based at least in part on a non-firm service supply arrangement associated with each load and at least one supplier of electricity,
wherein the non-firm service supply arrangement defines electricity usage based at least in part on at least one reliability level of the electrical supply provided by the at least one supplier of electricity without at least one guaranteed level of uninterrupted electricity supply, wherein the at least one reliability level of the electrical supply is based at least in part on an ability to instruct, by the computer system, to reduce or shut off the electricity supply from the electrical distribution grid in accordance with the non-firm service supply arrangement;
wherein the firm electricity service is based at least in part on a firm service supply arrangement associated with each load and the at least one supplier of electricity, and
wherein the firm service supply agreement defines the guaranteed level of uninterrupted electricity supply provided by the at least one supplier of electricity to each associated load;
code to determine electricity demand over at least one electric grid; and
code to optimize the electricity demand over at least one electric grid by adjusting the electricity supply to the at least one first load and the at least one second load based at least in part on a plurality of the following:
i) the first load data,
ii) the second load data;
iii) the electricity demand,
iv) the service type indication,
v) the at least one reliability level of the electrical supply defined by the non-firm service supply arrangement, and
vi) the at least one guaranteed level of uninterrupted electricity supply defined by the firm service supply arrangement.

11. The system of claim 10, wherein the at least one first smart node and the at least one second smart mode are electrical switches.

12. The system of claim 10, wherein the non-firm service supply arrangement is a contract.

13. The system of claim 10, wherein the firm service supply arrangement is a contract.

14. The system of claim 1, wherein the at least one first load participates in the non-firm service supply arrangement to receives the non-firm electricity service during at least one first portion of a time period and participates in the firm service supply arrangement to receives the firm electricity service during at least one second portion of the time period.

15. The system of claim 14, wherein the at least one second load participates in the non-firm service supply arrangement to receives the non-firm electricity service during the time period.

16. The system of claim 10, wherein the system further comprising code to calculate at least one reliability level of the non-firm service supply arrangement by utilizing deterministic or probability calculations based at least in part on one of the following criteria:
   i) supplier historical data of the electricity demand of the at least one supplier of electricity;
   ii) first load historical data for the at least one first load data; and
   iii) second load historical data for the at least one second load.

17. The method of claim 10, wherein the system further comprising:
   code to receive supplier data about at least one supplier cost associated with the electricity supply provided by the at least one supplier of electricity;
   code to receive electricity market data about at least one market cost of electricity; and
   code to calculate at least one price for the at least one reliability level of the non-firm service supply arrangement based at least in part on the at least one supplier cost in the received supplier data and the at least one market cost in the received market data.

18. The method of claim 14, wherein the at least one second load participates in the firm service supply arrangement to receives the firm electricity service during the time period and the at least one first load and the at least one second load participate in an arrangement by which the at least one first load receives the electricity supply intended for the at least one second load during at least one first portion of the time period when the at least one first smart node is instructed to reduce or shut off the electricity supply from the electrical distribution grid of the at least one supplier of electricity to the at least one first load in accordance with the non-firm service supply arrangement.

* * * * *

UNITED STATES PATENT AND TRADEMARK OFFICE
CERTIFICATE OF CORRECTION

| | | |
|---|---|---|
| PATENT NO. | : 8,521,337 B1 | Page 1 of 1 |
| APPLICATION NO. | : 13/187335 | |
| DATED | : August 27, 2013 | |
| INVENTOR(S) | : John A. Johnson | |

It is certified that error appears in the above-identified patent and that said Letters Patent is hereby corrected as shown below:

In the Claims

Col. 24, Ln. 29, Delete "a" before the phrase "computer system" and Insert --the--.

Signed and Sealed this
Eighth Day of October, 2013

Teresa Stanek Rea
*Deputy Director of the United States Patent and Trademark Office*